(12) United States Patent
Davis et al.

(10) Patent No.: US 10,614,064 B2
(45) Date of Patent: Apr. 7, 2020

(54) CLASS PATH BASED DATABASE OPERATIONS

(71) Applicant: ServiceNow, Inc., Santa Clara, CA (US)

(72) Inventors: Joseph Michael Davis, Carlsbad, CA (US); Joey Mart, San Marcos, CA (US)

(73) Assignee: ServiceNow, Inc., Santa Clara, CA (US)

( * ) Notice: Subject to any disclaimer, the term of this patent is extended or adjusted under 35 U.S.C. 154(b) by 318 days.

(21) Appl. No.: 15/586,147

(22) Filed: May 3, 2017

(65) Prior Publication Data

US 2018/0322167 A1 Nov. 8, 2018

(51) Int. Cl.
| | | |
|---|---|---|
| *G06F 16/00* | (2019.01) | |
| *G06F 16/2453* | (2019.01) | |
| *G06F 16/21* | (2019.01) | |
| *G06F 16/22* | (2019.01) | |
| *G06F 16/23* | (2019.01) | |
| *G06F 16/2455* | (2019.01) | |

(52) U.S. Cl.
CPC ...... *G06F 16/24537* (2019.01); *G06F 16/212* (2019.01); *G06F 16/217* (2019.01); *G06F 16/2246* (2019.01); *G06F 16/2379* (2019.01); *G06F 16/24553* (2019.01); *G06F 16/24561* (2019.01)

(58) Field of Classification Search
CPC .............. G06F 16/24537; G06F 16/2246
See application file for complete search history.

(56) References Cited

U.S. PATENT DOCUMENTS

| | | | | |
|---|---|---|---|---|
| 2005/0091183 | A1* | 4/2005 | Cunningham | ...... G06F 16/2246 |
| 2011/0055153 | A1* | 3/2011 | Hashimoto | ............... G06F 8/71 |
| | | | | 707/622 |

OTHER PUBLICATIONS

Extended European Search Report for EP Application No. EP18164718.1 dated Jun. 19, 2018; 13 pgs.
Bojan Zivanovi, Storing Hierarchical Data: Materialized Path (Apr. 25, 2014), available at https://web.archive.org/web/20160810221121/https://bojanz/wordpress.com/2014/04/25/storing-hierarchical-data-materialized-path/.
Ivaylo Atanassov, An Improvement of an Approach for Representation of Tree Structures in Relational Tables, CompSysTech II.9-1 to -6 (2007).
Vadim Tropashiko, SQL Design Patterns: The Expert Guide to SQL Programming 150-55 (1st ed. 2006).
Joe Celko, Joe Celko's Trees and Hierarchies in SQL for Smarties 35-43 (2004).

* cited by examiner

*Primary Examiner* — Grace Park
(74) *Attorney, Agent, or Firm* — Fletcher Yoder PC

(57) ABSTRACT

The present approach assigns a code to each node class of a data tree modeling a database. The node class codes may be used to generate a node class path for each node class. This class path may be used as a discriminator to reference a given node class or portion of the tree including the class path and may be stored in a field of the database and/or cached. Use of the class path in query operations reduces the complexity of certain queries, thereby speeding up query performance.

18 Claims, 3 Drawing Sheets

US 10,614,064 B2

CLASS PATH BASED DATABASE OPERATIONS

TECHNICAL FIELD

The present disclosure relates in general to improving database queries, such as create, read, update, and delete operations.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of data may be organized and stored in databases that are created, stored, and maintained on different types of computer-based systems. Examples of such databases include relational databases, which are well known and have been in use since the year 2000. Such databases may be used to store data ranging from personal information to data developed in large-scale industrial, commercial, and governmental contexts. Thus, such stored data sets may range from the trivially small in size to those that may encompass tens millions of records and data points, or more. As the number of records and the number of defined fields within a database grow in number however, the limitations of a given database architecture may impact the capability of a given database to be used efficiently.

By way of example, data stored in a database may be structured as interconnected logical classes corresponding to different types or sets of data. Such a model may be referred to as a tree or data tree, with each logical class corresponding to a different node of the tree. Each node in the tree data structure may be identified by a corresponding discriminator, which may generally correspond to a class name or identifier describing or characterizing that node. While it is fairly straightforward to reference terminal nodes of the data tree in a query, it may require more complex queries to properly reference non-terminal portions of the tree, which may encompass any number of related or sub-nodes. This complexity may reduce performance of the database with respect to queries or other operations performed on the database.

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in greater detail below, the present approach improves the query performance of a database in a manner that is transparent to a user. In particular, this approach assigns a code (e.g., a unique code) to each node class of a data tree that models a database. The class code may be used to reference the respective node class. The class codes may be used to generate a node class path (also referred to as a node path or class path herein) for each node class. This class path may be used as a discriminator to reference a given node class or portion of the tree including the class path and may be stored in a field of the database and/or cached. In essence, by storing and using the node class path in this manner, one is referencing not simply the node in question, but the path to the node and, potentially, other node class paths that may include the node class path in question. In this manner, use of the class path in query operations reduces the complexity of certain queries, thereby speeding up query performance.

In addition, use of such a node class path as a discriminator may help prevent the occurrence of orphaned records in a relational context. Such orphaned records are a form of data corruption and may occur when changes to one table with respect to a record are not reflected in a secondary table that may reference (or otherwise relate to) the changed field or record, thereby creating orphaned records for which a relationship to portions of a first table are lost. Such orphaned records may be difficult to find by query due to their lack of presence in some tables of the database. The present approach addresses such orphaned record problems by including the full path for each record within the record, thereby preventing situations where class or table changes may inadvertently corrupt the data relationships.

Figure 1:
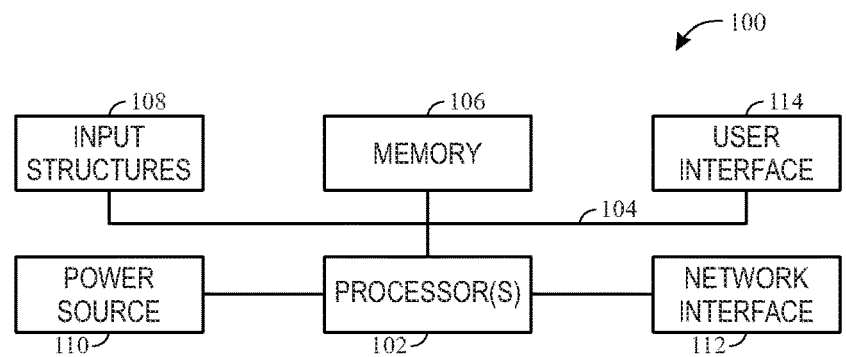
FIG. 1 is a block diagram of a computing device utilized in a distributed computing system of FIG. 1, in accordance with aspects of the present disclosure.

With this in mind, and by way of background, it may be appreciated that the present approach may be implemented using a processor-based system such as shown in FIG. 1. Likewise, the databases to which the present approach applies may be stored and maintained on such a processor-based system.

Such a system may include some or all of the computer components depicted in FIG. 1. FIG. 1 generally illustrates a block diagram of example components of a computing device 100 and their potential interconnections or communication paths, such as along one or more busses. The computing device 100 may be an embodiment of a client, an application server, a database server, as discussed in greater detail below. As used herein, a computing device 100 may be implemented as a computing system that includes multiple computing devices and/or a single computing device, such as a mobile phone, a tablet computer, a laptop computer, a notebook computer, a desktop computer, a server computer, and/or other suitable computing devices.

As illustrated, the computing device 100 may include various hardware components. For example, the device includes one or more processors 102, one or more busses 104, memory 106, input structures 108, a power source 110, a network interface 112, a user interface 214, and/or other computer components useful in performing the functions described herein.

The one or more processors 102 may include processor capable of performing instructions stored in the memory 106. For example, the one or more processors may include microprocessors, system on a chips (SoCs), or any other performing functions by executing instructions stored in the memory 106. Additionally or alternatively, the one or more processors 102 may include application-specific integrated circuits (ASICs), field-programmable gate arrays (FPGAs), and/or other devices designed to perform some or all of the functions discussed herein without calling instructions from the memory 106. Moreover, the functions of the one or more processors 102 may be distributed across multiple processors in a single physical device or in multiple processors in more than one physical device. The one or more processors 102 may also include specialized processors, such as a graphics processing unit (GPU).

The one or more busses 104 includes suitable electrical channels to provide data and/or power between the various components of the computing device. For example, the one or more busses 104 may include a power bus from the power source 110 to the various components of the computing device. Additionally, in some embodiments, the one or more busses 104 may include a dedicated bus among the one or more processors 102 and/or the memory 106.

The memory 106 may include any tangible, non-transitory, and computer-readable storage media. For example, the memory 106 may include volatile memory, non-volatile memory, or any combination thereof. For instance, the memory 106 may include read-only memory (ROM), randomly accessible memory (RAM), disk drives, solid state drives, external flash memory, or any combination thereof. Although shown as a single block in FIG. 1, the memory 106 can be implemented using multiple physical units in one or more physical locations. The one or more processors 102 access data in the memory 106 via the one or more busses 104.

The input structures 108 provide structures to input data and/or commands to the one or more processor 102. For example, the input structures 108 include a positional input device, such as a mouse, touchpad, touchscreen, and/or the like. The input structures 108 may also include a manual input, such as a keyboard and the like. These input structures 108 may be used to input data and/or commands to the one or more processors 102 via the one or more busses 104. The input structures 108 may alternatively or additionally include other input devices. For example, the input structures 108 may include sensors or detectors that monitor the computing device 100 or an environment around the computing device 100. For example, a computing device 100 can contain a geospatial device, such as a global positioning system (GPS) location unit. The input structures 108 may also monitor operating conditions (e.g., temperatures) of various components of the computing device 100, such as the one or more processors 102.

The power source 110 can be any suitable source for power of the various components of the computing device 100. For example, the power source 110 may include line power and/or a battery source to provide power to the various components of the computing device 100 via the one or more busses 104.

The network interface 112 is also coupled to the processor 102 via the one or more busses 104. The network interface 112 includes one or more transceivers capable of communicating with other devices over one or more networks (e.g., a communication channel). The network interface 112 may provide a wired network interface, such as Ethernet, or a wireless network interface, such an 802.11, Bluetooth, cellular (e.g., LTE), or other wireless connections. Moreover, the computing device 100 may communicate with other devices via the network interface 112 using one or more network protocols, such as Transmission Control Protocol/Internet Protocol (TCP/IP), power line communication (PLC), WiFi, infrared, and/or other suitable protocols.

A user interface 114 may include a display that is configured to display images transferred to it from the one or more processors 102. The display may include a liquid crystal display (LCD), a cathode-ray tube (CRT), a light emitting diode (LED) display, an organic light emitting diode display (OLED), or other suitable display. In addition and/or alternative to the display, the user interface 114 may include other devices for interfacing with a user. For example, the user interface 114 may include lights (e.g., LEDs), speakers, and the like.

Figure 2:
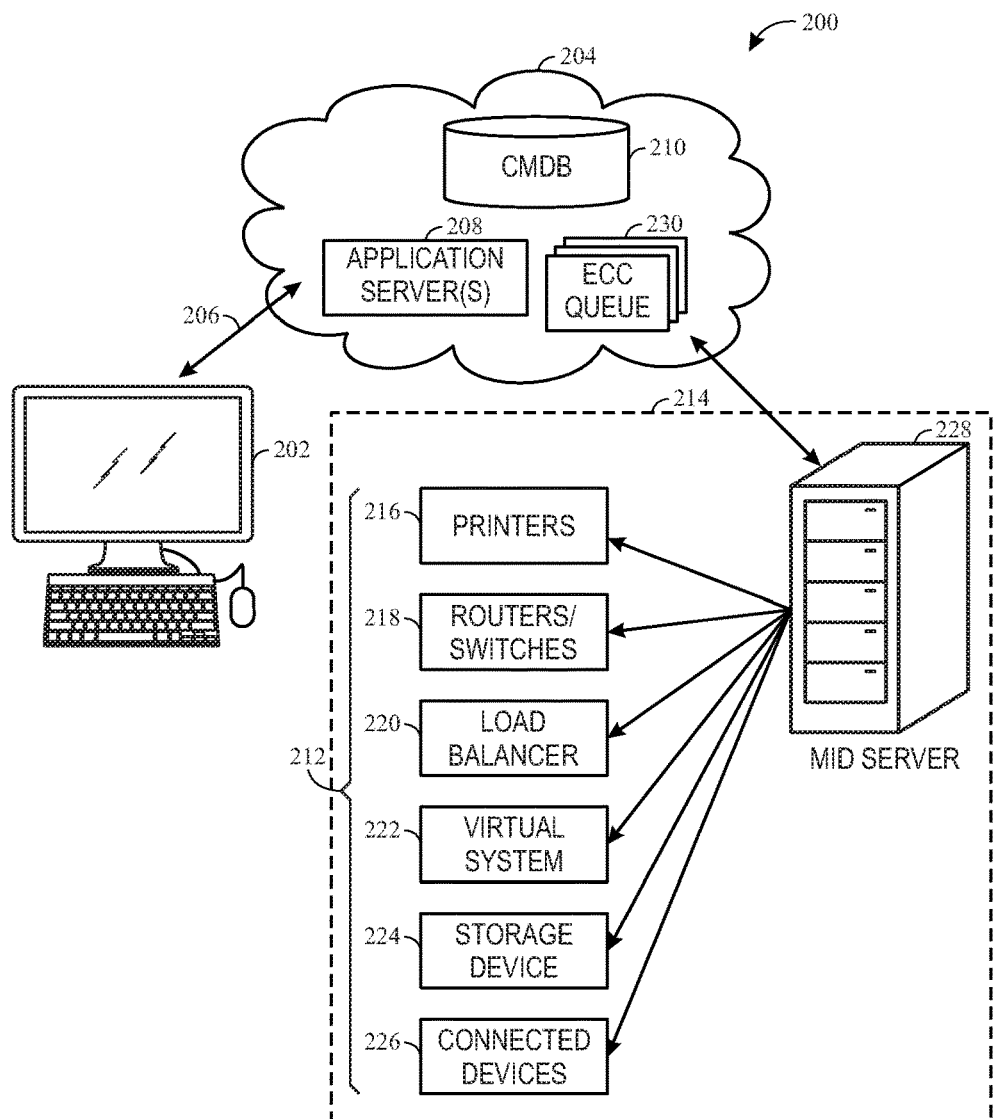
FIG. 2 is a block diagram of a distributed computing system, in accordance with aspects of the present disclosure.

A real-world context in which processor-based systems, such as the computing device 100 of FIG. 1, may be employed to implement the present approach, is shown in FIG. 2. In this example, a number of computing devices 100 are employed to implement a distributed computing framework 200, shown as a block diagram in FIG. 2, in which certain of the constituent devices may maintain or interact with a database in accordance with the approach discussed herein.

With this in mind, and turning to FIG. 2, a client 202 communicates with a platform 204, such as a cloud service platform, over a communication channel 206. The client 202 may include any suitable computing system. For instance, the client 202 may include one or more computing devices 100, such as a mobile phone, a tablet computer, a laptop computer, a notebook computer, a desktop computer, or any other suitable computing device or combination of computing devices. The client 202 may include client application programs running on the computing devices. The client 202 can be implemented using a single physical unit or a combination of physical units (e.g., distributed computing) running one or more client application programs. Furthermore, in some embodiments, a single physical unit (e.g., server) may run multiple client application programs simultaneously.

The platform 204 may include any suitable number of computing devices (e.g., computers) in one or more locations that are connected together using one or more networks. For instance, the platform 204 may include various computers acting as servers in datacenters at one or more geographic locations where the computers communicate using network and/or Internet connections. The communication channel 206 may include any suitable communication mechanism for electronic communication between the client 202 and the platform 204. The communication channel 206 may incorporate local area networks (LANs), wide area networks (WANs), virtual private networks (VPNs), cellular networks (e.g., long term evolution networks), and/or other network types for transferring data between the client 202 and the platform 204. For example, the communication channel 206 may include an Internet connection when the client 202 is not on a local network common with the platform 204. Additionally or alternatively, the communication channel 206 may include network connection sections when the client and the platform 204 are on different networks or entirely using network connections when the client 202 and the platform 204 share a common network.

Although only a single client 202 is shown connected to the platform 204, it should be noted that platform 204 may connect to multiple clients (e.g., tens, hundreds, or thousands of clients 202).

Through the platform 204, the client 202 may connect to various devices with various functionality, such as gateways, routers, load balancers, databases, application servers running application programs on one or more nodes, or other devices that may be accessed via the platform 204. For example, the client 202 may connect to an application server 208 and/or one or more databases 210 via the platform 204. The application server 208 may include any computing system, such as a desktop computer, laptop computer, server computer, and/or any other computing device capable of providing functionality from an application program to the client 202. The application server 208 may include one or more application nodes running application programs whose functionality is provided to the client via the platform 204. The application nodes may be implemented using processing threads, virtual machine instantiations, or other computing features of the application server 208. Moreover, the application nodes may store, evaluate, or retrieve data from the databases 210 and/or a database server.

The databases 210 may contain a series of tables containing information about assets and enterprise services controlled by a client 202 and the configurations of these assets and services. In one such example, a database maintaining such asset and service data may be referred to as a configuration management database (CMDB). Such a CMDB database may have over 500 tables and more than 7 organizational levels. In such an implementation, the assets and services include configuration items (CIs) 212 that may be computers, other devices on a network 214 (or group of networks), software contracts and/or licenses, or enterprise services. The CIs 212 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 212 may include a combination of physical resources, logical resources, or virtual resources. For example, the illustrated example of CIs 212 includes printers 216, routers/switches 218, load balancers 220, virtual systems 220, storage devices 224, and/or other connected devices 226. The other connected devices 226 may include clusters of connected computing devices or functions such as data centers, computer rooms, databases, or other suitable devices. Additionally or alternatively, the connected devices 2269 may include facility-controlling devices having aspects that are accessible via network communication, such as heating, ventilation, and air conditioning (HVAC) units, fuel tanks, power equipment, and the like. The databases 210 may include information related to CIs 212, attributes (e.g., roles, characteristics of elements, etc.) associated with the CIs 212, and/or relationships between the CIs 212.

As noted above, in one implementation, the databases 210 may include a CMDB that may store the data concerning CIs 212 mentioned above along with data related various IT assets that may be present within the network 214. In addition to the databases 210, the platform 104 may include one or more other database servers configured to store, manage, or otherwise provide data for delivering services to the client 202 over the communication channel 206. The database server may include one or more additional databases that are accessible by the application server 208, the client 202, and/or other devices external to the additional databases. The additional databases may be implemented and/or managed using any suitable implementations, such as a relational database management system (RDBMS), a time series database management system, an object database, an extensible markup language (XML) database, a management information base (MIB), one or more flat files, and/or or other suitable non-transient storage structures. In some embodiments, more than a single database server may be present in the distributed computing framework 200. Furthermore, in some embodiments, the platform 204 may have access to one or more databases external to the platform 204 entirely.

In the depicted topology, access to the CIs 212 from the platform 204 is enabled via a management, instrumentation, and discovery (MID) server 228 via an external communications channel queue 230. The MID server 126 may include an application program (e.g., Java application) that runs as a service (e.g., Windows service or UNIX daemon) that facilitates communication and movement of data between the platform 204 and external applications, data sources, and/or services. The MID service 228 may be executed using a computing device (e.g., server or computer) on the network 214 that communicates with the platform 204. The MID server 228 may periodically or intermittently use discovery probes to determine information on devices connected to the network 214 and return the probe results back to the platform 204, such as to create or update a database 210 configured as a CMDB. In the illustrated embodiment, the MID server 228 is located inside the network 214 thereby alleviating the use of a firewall in communication between the CIs 212 and the MID server 228. However, in some embodiments, a secure tunnel may be generated between a MID server 228 running in the platform 204 that communicates with a border gateway device of the network 214.

Although the distributed computing framework 200 is described as having the application servers 208, the databases 210, the communications channel 230, the MID server 228, and the like, it should be noted that the embodiments disclosed herein are not limited to the components described as being part of the framework 200. Indeed, the components depicted in FIG. 2 are merely provided as example components and the framework 200 should not be limited to the components described herein.

Further, it should be noted that server systems described herein may communicate with each other via a number of suitable communication protocols, such as via wired communication networks, wireless communication networks, and the like. In the same manner, the client 202 may communicate with a number of server systems via a suitable communication network without interfacing its communication via the platform 204.

With the preceding system and device level background in mind, the present approach relates to a database structure that may be implemented on a processor-based system and in a distributed environment as discussed with respect to FIGS. 1 and 2. To facilitate explanation and to provide a useful real-world context, a database in the form of a CMDB, as discussed above, will be used as an example to describe both a conventional table organization and query approach as well as the present approach, thereby providing a useful contrast. However, it should be understood that the present approach may be applied to other suitable databases and is not limited to CMDB implementations.

As discussed herein, a database may consist of a number of tables, which are often defined based on some logical characteristic common to the records stored in the table (e.g., address information in an address table of a mailing database, error events in an error table of an event log, vehicles in a vehicle table of a registration database, and so forth). Each table in turn is characterized by a number of records for which one or more different types of data are stored in respective fields of the table. By way of example, in a vehicle registration database one table may have a record for each registered vehicle, with each vehicle record having associated fields for storing information specific to the respective vehicle (e.g., vehicle year, make, model, color, identification number, and so forth). In such an example, other tables may exist in the same database containing owner information, accident information, repair history, recall notices and so forth, with each table having its own set of records which in turn have respective fields related to the records within that table. In a relational database context, these tables may be linked together based on known relationships between tables (e.g., between owners and vehicles), allowing the stored data to be accessed or manipulated in useful ways.

In addition, each table may have multiple fields that are indexed or that serve as indexes, such that the table is more readily searched or manipulated when referenced by an indexed field. For the purpose of explanation and visualization, such a table may conceived of as records in rows within the table (i.e., run vertically within the table) and the different fields of data for each record are columns (i.e., run horizontally within the table). As will be appreciated however, such directionality and two-dimensionality is an arbitrary convention and should not be viewed as limiting.

In the case of a configuration management database (CMDB), as discussed by way of example herein, the database stores information about assets and enterprise services of an entity and the configurations of these assets and services. The asset and service data stored in a CMDB typically includes configuration items (CIs) that may relate to hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models).

In a conventional approach, the tables for a CMDB may be logically characterized based on classes (either abstract or concrete) corresponding to the type of data in question. Thus, in conventional contexts, each class may be represented by a separate discrete table structure within the database. However, in other contexts the database may not employ a table-per-class type architecture and may instead create and manage tables based on other criteria, including having a single-table structure or a multi-table architecture where the multiple tables are instead arranged or managed based on factors that improve query speed or other performance factors. One example of an alternative approach to having a table-per-class is a table-per-partition approach, discussion of which can be found in "TABLE-PER-PARTITION", filed by SERVICENOW INC. on the same day as the present disclosure and incorporated herein by reference in its entirety for all purposes. In such arrangements where the tables are not based on class, a logical model of the database may be accessible to the clients, while the tables themselves are inaccessible to the clients, with the database layer translating client code directed to the client-facing logical model into SQL scripts referencing the appropriate tables. Regardless of the table architecture employed, the logical class associated with a record is maintained at some level, either at the table level in a table-per-class context, or within a field of the record in other contexts.

With these concepts in mind, it may be appreciated that the different logical classes of data in a database may be related or organized as a data tree (with each logical class being a node of the tree) which makes explicit the interrelationships between classes. A typical approach employed when organizing logical classes as a tree is to use one table to store all classes and fields. In such an approach, each class is identified by a discriminator, such as a discriminator field of the table which stores a string identifying the logical class of the record.

Such a model may be suitable for querying leaf nodes of the tree, as the query may simply specify the class of interest based on a single discriminator, with no sub-classes being implicated in a leaf node context. For example, in a query to identify UNIX servers within a CMDB, a suitable query may be:

SELECT count(*)
FROM cmdb cmdb0 WHERE cmdb0.'discriminator' = 'cmdb_ci_unix_server where the respective class corresponds to the leaf node of the tree that is of interest.

However, when querying for non-leaf subtree portions of the tree (i.e., nodes having sub-nodes), the query becomes substantially more complex in order to retrieve all nodes in the tree using the discriminator field of interest. For example, the query:

SELECT count(*) FROM cmdb cmdb0 WHERE cmdb0.'discriminator'
IN
('cmdb_ci_server','cmdb_ci_cim_server','cmdb_ci_unix_server',
'cmdb_ci_solaris_server','cmdb_ci_aix_server',
'cmdb_ci_hpux_server','cmdb_ci_mainframe_lpar',
'cmdb_ci_virtualization_server','cmdb_ci_vcenter_server_obj',
'cmdb_ci_esx_server','cmdb_ci_hyper_v_server',
'cmdb_ci_netware_server','cmdb_ci_lb','cmdb_ci_lb_isa',
'cmdb_ci_lb_network','cmdb_ci_lb_cisco_csm','cmdb_ci_lb_bigip',
'cmdb_ci_lb_cisco_css','cmdb_ci_lb_ace','cmdb_ci_lb_a10'
,'cmdb_ci_lb_f5_gtm','cmdb_ci_lb_f5_ltm','cmdb_ci_lb_netscaler',
'cmdb_ci_lb_alteon','cmdb_ci_lb_radware','cmdb_ci_linux_server',
'cmdb_ci_osx_server','cmdb_ci_storage_server','cmdb_ci_win_server',
'cmdb_ci_mainframe')

may be used to select all instances of "server" in the discriminator field in an instance where various types of server classes (i.e., types of servers) are present.

As may be appreciated in this example, the IN clause used to formulate the query increases in scope as the data tree grows in breadth and/or depth, potentially encompassing more and more node classes. This can be lead to performance problems since each factor specified in the IN clause (e.g., IN (a, b, c)) evaluates to an OR when executed (e.g., (=a, OR=b, OR=c), effectively becoming a large number of separate queries. A large number of OR clauses generated in this manner may be difficult for a database to optimize. In particular, because an OR can have many clauses, no single optimization strategy can be universally applied. Further, due to the possibly large number of clauses, it may be infeasible to try all possible optimization strategies. Instead, conventional approaches typically evaluate each comparison, essentially scanning through each record separately for each term specified by the OR clause, to identify matching results, which may be substantially less efficient than approaches where an index may be employed.

Figure 3:
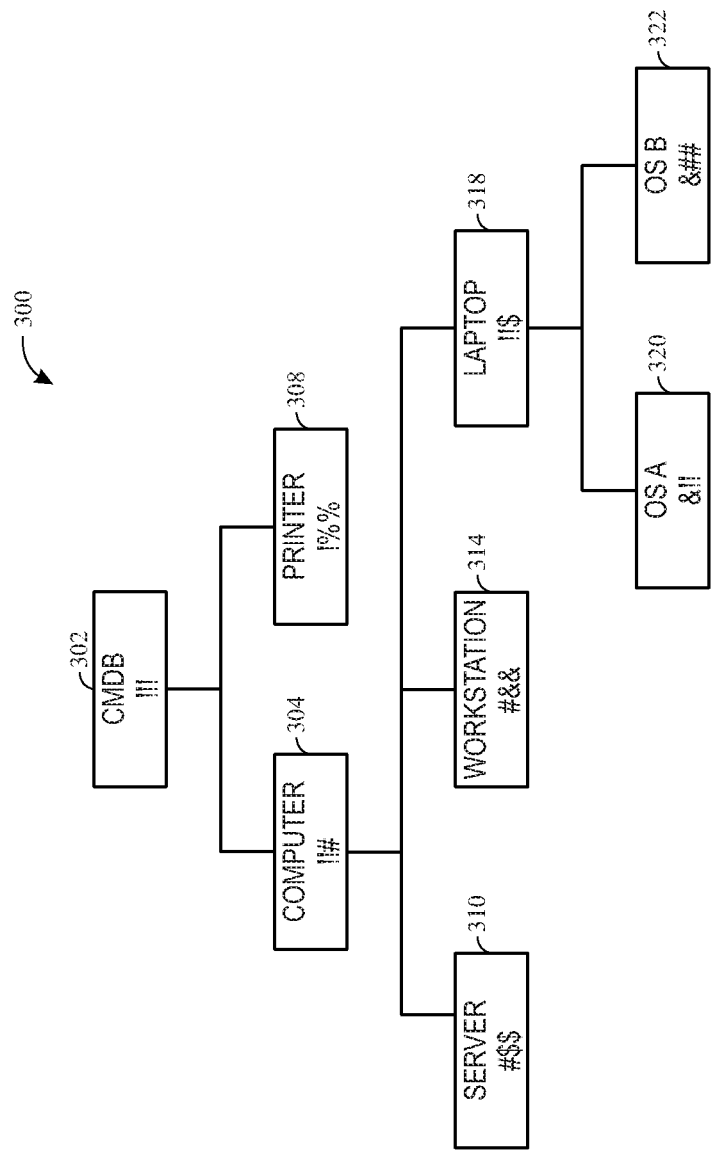
FIG. 3 depicts a class structure and class-based codes, in accordance with aspects of the present disclosure.

The present approach addresses the issues related to large IN clauses. In an implementation each node class is assigned a unique code (e.g., !!!, ! !#, ##$, and so forth), which may be stored in a sys_class_code or similar field. In one implementation, sixty characters are available for class codes (e.g., !#$( ) *+,-.0123456789:;<?@ABCDEFGHI-JKLMNOPQRSTUVW XYZ[ ]/\'}|{~&). Though three character codes are shown in certain of the present examples, the character codes may be two, three, four characters in length, or any other suitable length, as determined by context and database constraints. Assuming a sixty character set, two character codes allow for 3600 usable combinations. Class codes may, in one implementation, be assigned in table name order and ordered by natural ASCII sort order to preserve table name sort order. An example, is shown in FIG. 3 where a class tree 300 of a CMDB is depicted having nodes corresponding to each logical class in the tree. In the depicted example, a CMDB node 302, a Computer node 304, a Printer node 308, a Server node 310, a Workstation node 314, a Laptop node 318, an OS A node 320, and an OS B node 322 are depicted along with a corresponding code for each node.

As shown in this example, node classes of the tree are organized such that certain nodes constitute logical subsets of other nodes. For example, one node in this example is the CMDB node 302. This CMDB node encompasses a computer node 304 and a printer node 308. The computer node 304 encompasses multiple nodes: the server node 310, the workstation node 314, and the laptop node 318. The laptop node 318 in turn may be characterized based on operating system (e.g., OS a or OS B), giving rise to OS A node 320 and OS B node 322. Thus, based on this organizational framework, each node class may be described not only by its name, but by a path through the tree describing a logical or subset relationship characterizing a respective class.

Figure 4:
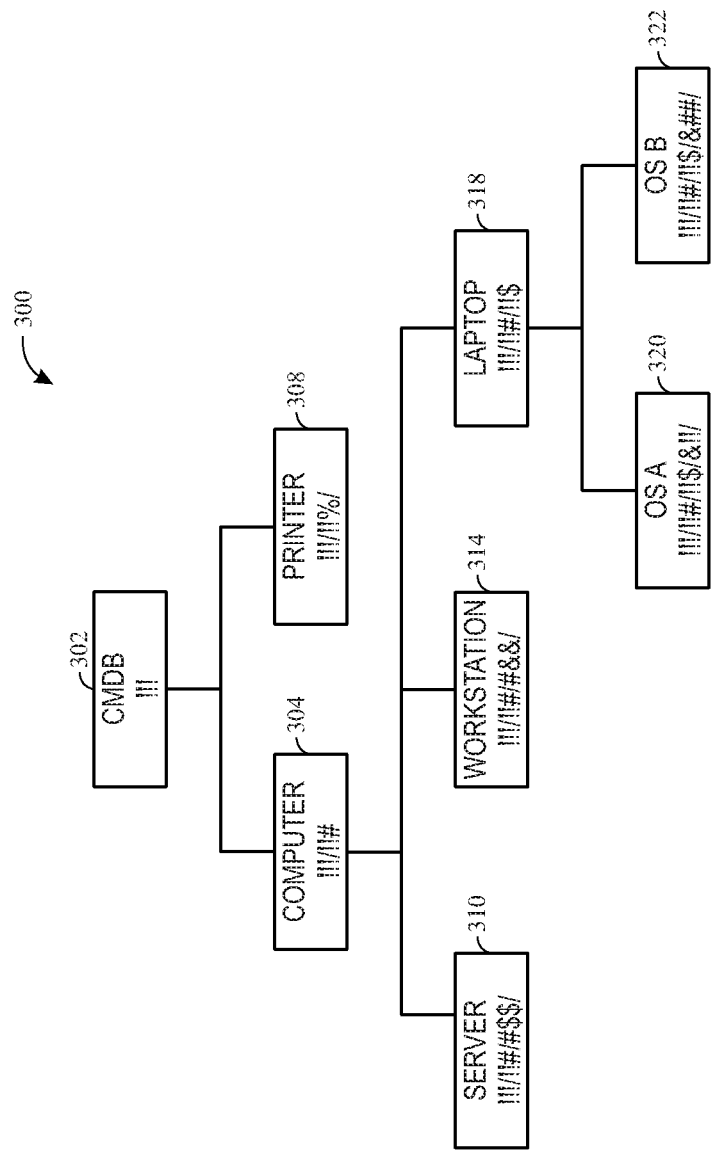
FIG. 4 depicts the class structure of FIG. 3 with class paths for each node based on the class codes, in accordance with aspects of the present disclosure.

In this example, each class is assigned a unique code so that a class may be referenced using the corresponding code. Based on these codes, any path in the tree can be encoded as a character string to create a node or class path unique to each node class. FIG. 4 depicts the tree structure of FIG. 3, but with each node including the respective class path corresponding to that node.

This class path based on the assigned codes may be stored in a specified database field, such as a sys_class_path field, for each node such that all data of a given logical class has a sys_class_path as well as a sys_class_name. In one embodiment, the class path for each node may be cached or otherwise stored as the discriminator (or discriminator path) for each node class. Queries may then be performed using the cached discriminator path. Such an approach may yield certain benefits, including preventing the occurrence of orphaned records since each record includes path information identifying related nodes within the class path. As a corollary, by storing the class path as the discriminator, this discriminator path conveys not only a name of the class associated with the record, but also the path to that class through the logical data tree structure.

With this example in mind, the class path for the leaf (i.e., terminal) node corresponding to a Laptop running OS B from FIG. 4 is: !!!/!!#/!!$/&##/. The class path may be used in queries to reference this node class. For non-leaf parts of the sub-tree, such as the Laptop node class, a query may instead employ the cached class path value using the LIKE syntax to identify all parts of the sub-tree: e.g., WHERE sys_class_path LIKE '!!!/!!#/!!$/%'. This LIKE syntax, unlike the IN syntax does not evaluate to multiple OR comparisons but instead identifies those class path instances containing the reference string, here the !!!/!!#/!!$ (Laptop), !!!/!!#/!!$/&!!/ (OS A), and !!!/!!#/!!$/&##/ (OS B) strings.

Thus, the use of class paths as discussed herein instead of conventional discriminators allows IN clauses to be avoided. For example, in place of an IN clause based query such as:

```
SELECT count(*) FROM cmdb cmdb0
  WHERE cmdb0.'discriminator' IN (a,a1,a2)
``` which evaluates as multiple OR clauses, a more computationally friendly LIKE clause may be employed using the cached class path, such as:

```
SELECT count(*) FROM cmdb cmdb0
  WHERE cmdb0.'discriminator_path' LIKE '!!!/!!#/!!$/%'
``` in which all class paths including the specified class path within their class path are retrieved.

One tangible benefit of the present approach is improved query performance. This benefit is demonstrated by a comparison of an actual implementation of the present class path approach compared to a conventional approach. With respect to the conventional approach a query was run having a large number of IN clauses. This IN clause query was of the form: SELECT count(*) FROM cmdb cmdb0 WHERE cmdb0 'discriminator' IN ( . . . ). When executed, this query yielded the performance metrics shown in Table 1.

In comparison, a query was run utilizing a cached class path (e.g., discriminator_path) which was utilized in the query. This class path query was of the form: SELECT count(*) FROM cmdb cmdb0 WHERE cmdb0. 'discriminator_path' LIKE '!!!/!!#/%' and yielded the performance metrics shown in Table 2.

Based on these metrics, it can be seen that the class path query was faster, offering a 20% improvement in execution speed (i.e., 0.9 seconds compared to 1.12 seconds and thereby improving throughput. In addition, the class path query spent less time gathering statistics, demonstrating a 70% improvement (i.e., 0.00012 seconds compared to 0.00041 second. The class path query also utilized less CPU, demonstrating a 52% user CPU improvement (2.77 compared to 5.89) and an 80% system CPU improvement (0.2 compared to 1.03). The class path query performed less context switching with an 86% improvement in voluntary switches (~100 k compared to 13 k) and a 56% improvement in involuntary switches (~1.6 k compared to 694). The class path query also utilized less IO, with a 97% improvement (~37 k compared to 896 blocks read. As will be appreciated, these improvements in performance compared to conventional queries employing IN clauses correspond to substantial benefits in database performance.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

assigning a class path to each node class of the CMDB, wherein each class path of the CMDB is encoded as a respective code or a respective string of codes that conveys a path through the data tree to a respective node class; and storing the class path of each node class in a class path field of the CMDB.

2. The system of claim 1, wherein the instructions cause the system to perform operations comprising:

TABLE 1

Query Performance Metrics for IN clause Query

| STATE | DURATION | CPU-USER | CPU-SYSTEM | CONTEXT-VOLUNTARY | CONTEXT-INVOLUNTARY | BLOCK OPS-IN | BLOCK OPS-OUT |
|---|---|---|---|---|---|---|---|
| starting | 0.000206 | 0 | 0 | 3 | 0 | 0 | 0 |
| checking permissions | 0.00006 | 0 | 0 | 2 | 0 | 0 | 0 |
| Opening tables | 0.000066 | 0 | 0 | 2 | 0 | 0 | 0 |
| System lock | 0.000058 | 0 | 0 | 0 | 0 | 0 | 0 |
| init | 0.000066 | 0 | 0 | 1 | 0 | 0 | 0 |
| optimizing | 0.000055 | 0 | 0 | 0 | 0 | 0 | 0 |
| statistics | 0.00041 | 0.004 | 0 | 19 | 0 | 0 | 0 |
| preparing | 0.000058 | 0.001 | 0 | 1 | 0 | 0 | 0 |
| executing | 0.000054 | 0 | 0 | 2 | 0 | 0 | 0 |
| Sending data | 1.122556 | 5.892104 | 1.037842 | 103696 | 1602 | 37016 | 15160 |
| end | 0.000183 | 0.001 | 0 | 19 | 1 | 0 | 0 |
| query end | 0.000072 | 0 | 0.002 | 26 | 2 | 0 | 0 |
| closing tables | 0.000082 | 0 | 0 | 34 | 0 | 0 | 0 |
| freeing items | 0.000199 | 0 | 0.002 | 74 | 0 | 0 | 0 |
| logging slow query | 0.000063 | 0 | 0 | 31 | 0 | 0 | 0 |
| logging slow query | 0.000087 | 0.001 | 0 | 31 | 0 | 0 | 0 |
| cleaning up | 0.000097 | 0.000999 | 0 | 31 | 0 | 0 | 0 |

TABLE 2

Query Performance Metrics for Class Path clause Query

| STATE | DURATION | CPU-USER | CPU-SYSTEM | CONTEXT-VOLUNTARY | CONTEXT-INVOLUNTARY | BLOCK OPS-IN | BLOCK OPS-OUT |
|---|---|---|---|---|---|---|---|
| starting | 0.000198 | 0 | 0 | 0 | 0 | 0 | 0 |
| checking permissions | 0.000055 | 0 | 0 | 1 | 0 | 0 | 0 |
| Opening tables | 0.000059 | 0 | 0 | 0 | 0 | 0 | 0 |
| System lock | 0.000058 | 0 | 0 | 0 | 0 | 0 | 0 |
| init | 0.000061 | 0 | 0 | 0 | 0 | 0 | 0 |
| optimizing | 0.000055 | 0 | 0 | 0 | 0 | 0 | 0 |
| statistics | 0.000124 | 0 | 0 | 0 | 0 | 0 | 0 |
| preparing | 0.000056 | 0 | 0 | 0 | 0 | 0 | 0 |
| executing | 0.000054 | 0 | 0 | 1 | 0 | 0 | 0 |
| Sending data | 0.909662 | 2.773578 | 0.207969 | 13750 | 694 | 896 | 4880 |
| end | 0.000138 | 0 | 0 | 1 | 0 | 0 | 0 |
| query end | 0.000051 | 0.001 | 0 | 1 | 0 | 0 | 0 |
| closing tables | 0.000088 | 0 | 0 | 1 | 0 | 0 | 0 |
| freeing items | 0.000111 | 0 | 0 | 0 | 0 | 0 | 0 |
| logging slow query | 0.00006 | 0 | 0 | 0 | 1 | 0 | 0 |
| logging slow query | 0.000065 | 0 | 0.001999 | 0 | 0 | 0 | 0 |
| cleaning up | 0.000198 | 0 | 0 | 0 | 0 | 0 | 0 |

What is claimed is:

1. A system, comprising:
a configuration management database (CMDB);
one or more hardware processors configured to execute instructions from a non-transitory memory to cause the system to perform operations comprising:
assign a code to each node class of a data tree associated with the CMDB, wherein each node class of the data tree has a different code and the code of each node class is different than a class identifier of the node class;

upon receipt of an operation instruction, using one or more of the stored class paths referenced by the operation instruction to perform an operation on the CMDB.

3. The system of claim 2, wherein the operation comprises one or more of a create, read, update or delete operation.

4. The system of claim 2, wherein the operation instruction comprises LIKE syntax referencing one or more stored class paths.

5. A system, comprising:
a configuration management database (CMDB);
a non-transitory memory; and one or more hardware processors that execute instructions from the non-transitory memory to cause the system to perform operations comprising:
- assigning a code to each node class of a data tree associated with the CMDB, wherein each node class of the data tree has a different code and the code of each node class is different than a class identifier of the node class;
- determining a class path for each node class, wherein each class path is encoded as respective code or a respective string of codes conveying a node path through the data tree to a respective node class;
- storing the class path for each node class in a class path field of the CMDB;
- receiving a request to perform one or more structured query language (SQL) operations;
- identifying a stored class path based at least on the request;
- identifying a configuration item from the CMDB that corresponds to the stored class path; and
- performing the one or more SQL operations with the identified configuration item in accordance with the request.

6. The system of claim 5, wherein identifying the stored class path based at least on the request comprises identifying the stored class path from a cached database.

7. The system of claim 5, wherein the request comprises a SQL query corresponding to one or more of a create, read, update, or delete operation.

8. The system of claim 5, wherein the SQL query comprises LIKE syntax referencing the stored class path.

9. The system of claim 5, wherein the request does not evaluate to a plurality of OR operators.

10. A method, comprising:
- assigning a code to each node class of a data tree associated with a configuration management database (CMDB), wherein each node class of the data tree has a different code, the code of each node class is different than a class identifier of the node class, and a length of the code of each node class is determined based on one or more constraints of the CMDB;
- assigning a class path to each node class of the CMDB, wherein each class path is encoded as a respective code or a respective string of codes corresponding to respective node classes, and wherein each class path conveys a node path through the data tree to a respective node class; and
- storing the class path for each node class in a class path field of the CMDB.

11. The method of claim 10, wherein each node class corresponds to a configuration item type stored in the CMDB.

12. The method of claim 11, comprising:
- receiving a request to perform one or more structured query language (SQL) operations on the CMDB;
- identifying a respective stored class path referenced by the request;
- identifying a respective configuration item from the CMDB that corresponds to the respective stored class path; and
- performing the one or more SQL operations with the identified configuration item in accordance with the request.

13. The system of claim 12, wherein identifying the respective stored class path comprises identifying the respective stored class path from a cached database.

14. The system of claim 12, wherein the request comprises a SQL query corresponding to one or more of a create, read, update, or delete operation.

15. The system of claim 14, wherein the SQL query comprises LIKE syntax referencing the respective stored class path.

16. A non-transitory, tangible, and computer-readable medium storing instructions thereon that, when executed, are configured to cause one or more processors to:
- assign a code to each node class of a data tree associated with a configuration management database (CMDB), wherein each node class of the data tree has a different code and the code of each node class is different than a class identifier of the node class, and a length of the code of each node class is determined based on one or more constraints of the CMDB;
- assign a class path to each node class of the CMDB, wherein each class path is encoded as a respective code or a respective string of codes conveying a node path through the data tree to a respective node class;
- store the class path for each node class in a class path field of the CMDB;
- receive a request to perform one or more structured query language (SQL) operations on the CMDB;
- identify a respective stored class path referenced by the request;
- identify a respective configuration item from the CMDB that corresponds to the respective stored class path; and
- perform the one or more SQL operations with the identified configuration item in accordance with the request.

17. The non-transitory, tangible, and computer-readable medium of claim 16, wherein identifying the respective stored class path comprises identifying the respective stored class path from a cached database.

18. The non-transitory, tangible, and computer-readable medium of claim 16, wherein the SQL query comprises LIKE syntax referencing the respective stored class path.

* * * * *